United States Patent [19]

Evans et al.

[11] Patent Number: 5,202,136

[45] Date of Patent: Apr. 13, 1993

[54] ANIMAL FEED RATION

[75] Inventors: David S. Evans; Frederick H. Wellons; Michael G. Reiser, all of Greensboro, N.C.

[73] Assignee: CBP Resources, Inc., Greensboro, N.C.

[21] Appl. No.: 773,509

[22] Filed: Oct. 9, 1991

[51] Int. Cl.$^5$ ............................................. A23K 1/00
[52] U.S. Cl. ........................................ 426/2; 426/601; 426/607; 426/807
[58] Field of Search ............... 426/2, 807, 601, 607; 260/410.7, 409

[56] References Cited

U.S. PATENT DOCUMENTS

| | | | |
|---|---|---|---|
| 4,098,913 | 7/1978 | Baugher | 426/104 |
| 4,642,317 | 2/1987 | Palmquist et al. | 514/558 |
| 4,919,940 | 4/1990 | Wellons | 426/2 |

FOREIGN PATENT DOCUMENTS 1187732  5/1985  Canada .

*Primary Examiner*—R. B. Penland
*Attorney, Agent, or Firm*—Rhodes, Coats & Bennett

[57] ABSTRACT

A dietary process and animal feed for increasing the weight gaining rate of edible meat-producing animals while improving their carcass firmness and quality, which comprises feeding small granules (less than 1,000 microns) of highly saturated fats to the animals. These highly saturated fats may be added in prescribed amounts (preferably approximately 5%) of the primary dry feed ration. The highly saturated fats according to the present invention have an iodine value in the range of 5-35.

10 Claims, No Drawings

ANIMAL FEED RATION

BACKGROUND OF THE INVENTION

The present invention relates to an edible meat-producing animal feed ration and, more specifically, to a feed ration and feed process which permits such animals to be fed highly saturated fats during some or all of their growing-finishing cycle to increase the weight-gaining rate and improve the quality of the animal carcasses thereof.

The term "edible meat-producing animals", as used herein, is meant to define all animals that are raised, fattened and slaughtered for market. They include such animals as swine, beef cattle, and poultry, as well as possibly others. Each of these animals is subjected to a "growing-finishing cycle", at which time they are fed a particular ration which causes them to grow to their fullest capacity as quickly as possible, in preparation for slaughtering. The term "weight-gaining rate" as used herein refers to the number of pounds gained per day or other time period during the growing-finishing cycle. Obviously, the greater the weight-gaining rate, the quicker and more economically the animal can be brought to its intended weight and slaughtered. Feed rations which will reduce the growing-finishing cycle and thus increase profit are continually being sought. The description which follows is directed to swine, however, it is believed that the same concepts will apply to a greater or lesser extent to other edible meat-producing animals such as beef cattle and poultry.

Until the mid-1980's, swine have generally been fed no added feed fat at all during the growing-finishing cycle. The growing-finishing ration consists primarily of corn, soybeans, or a combination of corn and soybean meal. More recently, it has been determined that, if the ration includes unsaturated vegetable oils or animal fats, the weight gain rate of the animal will increase. In other words, the use of unsaturated vegetable or animal oils will reduce the growing-finishing cycle of the swine, and thus make the operation more profitable. In such diets, the unsaturated vegetable oils generally have an iodine value greater than 80 or the animal fat generally has an iodine value greater than 45.

While the use of such animal or vegetable oils has been successful in reducing the length of the growth cycle, the technique is not without its disadvantages. The quality of the meat has suffered considerably.

Pork obtained from swine which have been subjected to a diet containing a supplement of unsaturated fats alone has been found to suffer from one or more of the following problems:

1. abbreviated shelf-life;
2. diminished customer acceptance;
3. loss of product when cooking (shrinkage);
4. rapid oxidation or spoilage;
5. pale, soft, and exudative meat products (known as PSE);

Pale, soft and exudative pork (PSE) is a serious problem affecting the domestic pork market, because it reduces the quality of the processed product (ham and pork) intended for delicatessens and the home consumer. Because the carcass is so soft, it is almost impossible to slice with automatic slicing equipment which is available in substantially all delicatessens and supermarkets markets. Pigs fed unsaturated fats will likely have unsaturated fatty acids deposited in adipose and lean tissue. This is also known as "liquid fat" which appears in the meat after it is processed. The consumer will then notice the liquid fat exuding from the meat, and senses it as being "slimy". This also leads to excess shrinkage as the product is cooked.

The relationship between carcass firmness and quality and the source of dietary fat is therefore important. Some attempts have been made to use fully saturated or hydrogenated fats, which are solid at ambient temperature. However, this approach has been abandoned because the digestibility of such fats by the animals is extremely limited. In addressing the aforesaid problems, applicant has determined that the diet should include highly (but not fully) saturated or partially hydrogenated animal or vegetable fat, which remains waxy at ambient temperatures. By experimentation, it has been found that when animals' diets are switched from highly unsaturated vegetable oils to prilled, or small granule, highly saturated (partially hydrogenated) tallow or vegetable oil with iodine values between 5 and 35 during the latter portion of the growing-finishing cycle, the carcass firmness is improved, and the quality of the resulting meat product is significantly higher.

More surprisingly, it has been determined that the addition of highly saturated fats (IV = 5−35) to the diet produces significant weight gain rate advantages, particularly when the highly saturated fat is in the form of prilled or small granule (less than 1,000 microns) highly saturated or partially hydrogentated fats. Because of the higher digestibility characteristic, the animals apparently gain weight faster than with the best diets in use. In some cases, the weight gain rate is 40% higher than with conventional diets containing unsaturated or liquid oils.

It is believed that "prilling" of the highly saturated fats is an important factor in the digestibility and in achieving the carcass firmness desired. "Prilling" is the process of fast cooling of liquid fats or materials to room temperature as they are atomized and forced through a stream of cool air. The droplets then become small waxy granules or pellets ("prills" of a diameter of approximately 1,000 microns and less). Prilling is one known procedure for forming waxy pellets having a small diameter. Other procedures may be available or developed which may also provide excellent results, such as milling. Because of the large surface area per pound of such highly saturated fats, the digestibility is improved, resulting in a greater weight gain rate, as well as in improved carcass firmness and quality.

It is believed that iodine values in the range of 5-35 will achieve the desired results of the present invention. Uses of such saturated fats, preferably in "prills" or smaller granule form in amounts of approximately 5% of the diet of the subject animals for some or all of the growing period has greatly increased the weight-growing rate, improved carcass firmness, and improved the quality of the meat.

Further, in accordance with the present invention, it is recognized that the highly saturated fat can be useful as a carrier for or in combination with other useful nutrient sources for animals or with substances useful for he prevention or treatment of animal diseases. Examples of such sources and substances are:

amino acids and derivatives thereof such as methionine, lysine, trytophan, and other amino acids and derivatives vitamins and derivatives thereof such as Vitamin A, Beta carotene, Vitamin D, Vitamin C, Vitamin K, folic acid, biotin, etc.

enzymes such as protease, lipase, amylase, and other physiologically effective enzymes, etc.

animal drugs such as tetracycline type, amino sugar type, polysaccharide type, etc.

hormones such as estrogen, hexestrol, tyroprotein, etc.

nutrient sources such as protein, carbohydrates, etc.

effective microorganisms such as Lactobacillus and yeasts such as brewer's yeast minerals such a selenium, iron, etc.

These substances and nutrient sources may be used along or in any combination thereof.

It is therefore an object of the present invention to provide a dietary process for edible meat producing animals which may be used during the growing-finishing cycle to enhance the weight-gaining rate.

It is another object of the present invention to provide a dietary technique as described hereinabove which also improves meat quality by firming the carcass and reducing the problem of pale, soft and exudative meat.

It is yet another object of the present invention to provide a feed ration or composition which improves the weight-gaining rate while improving also carcass firmness and improving meat quality.

Other objects and a fuller understanding of the invention will become apparent from reading the following detailed description of a preferred embodiment.

DETAILED DESCRIPTION OF A PREFERRED EMBODIMENT

Turning now to a preferred embodiment of the present invention, there is first provided a feed supplement which includes the use of highly saturated fats. While it is possible to hydrogenate vegetable oils to an iodine value of less than 35 because of their initial high iodine value, it is a relatively expensive process. Thus, the preferred embodiment of the present invention utilizes highly saturated fatty acids in any form such as triglycerides, monoglycerides, diglycerides, and free fatty acids. Such fatty acids should contain at least 10 carbon atoms and preferably 10-24 carbon atoms. The selected fatty acids should either have an iodine value or be saturated to the point that the iodine value thereof is between 5 and 35 and preferably in the range of 16-20. While any natural fat (which is generally a mixture of several fatty acids having 10-24 carbon atoms) can be saturated by the process of hydrogenation to the extent that the iodine value is less than 35, in the case of unsaturated fats, the procedure may be expensive. However, certain saturated or highly saturated animal fats such as tallow, lard and grease are relatively low in IV value, easier to saturate or hydrogenate, are more readily available, have lower costs than higher iodine vegetable oils, and are therefore more economical in achieving the desired iodine value. The fats may consist of a mixture of fatty acids. The above-described highly saturated fats, sometimes hereinafter referred to as "feed supplement" is utilized in a process for providing such fatty acids to edible meat-producing animals in which the feed supplement is utilized in the form of prills or other small waxy granules along with the dry matter of the feed ration.

An example of a good ration for pigs is a cornsoybean meal. The feed supplement should make up at least 2% of the dry solid weights of the ration, no more than 10%, and preferably between 2-7% thereof (for example, 5%). As the normal vegetable material in the animal's diet contains approximately 2% fat, the total fat content of the diet provided by he feed supplement in amounts of 2-7% will increase to 4-9%.

There results a feed comprising at least one conventional feed ingredient that is edible by edible meat-producing animals and the aforementioned highly saturated animal or vegetable fats. The preferred conventional feed ingredient includes the group containing corn, soybean meal, corn silage, oats, barley, distillers grain, brewer's grain, wheat, milo, sorghum animal protein meal, and combinations thereof.

The invention will be further described by the following testing program:

24 pigs (4 pigs per pen of finishing pigs) with an initial weight of 125 lbs. were utilized. The pigs were allotted to three groups based on weight, sex, and ancestry. Within each group, pigs are assigned to one of four treatments as follows:

a. control diet (corn-soybean meal);

b. unsaturated fatty acid source (corn-soybean meal diet with 5% added soybean oil);

c. saturated fatty acid source #1 (corn-soybean meal diet with 5% added prilled animal fat hydrogenated to such a point that the iodine value was approximately 15;

d. saturated acid source #2 (corn-soybean meal diet with 5% added prilled animal fat hydrogenated to such a point that the iodine value was approximately 30.)

Pigs fed the control diet remained on this diet throughout the entire experiment (10 weeks). At the initiation of the study, pigs on all other treatments were fed diet (b) for four weeks to allow for unsaturation of fat depots in the animal. At the end of the initial time period, a first group of pigs assigned to treatments (c) and (d) were switched to their respective diets for the final 6 weeks. Pigs in the other two groups to be fed diets (c) and (d) were switched to their respective diets at 2 and 4 weeks after the initial feeding period. When the third group completed two weeks on their dietary treatments, all pigs were slaughtered and carcass firmness determined. Thus, pigs receiving treatments (c) and (d) were fed hardening diets for either 2, 4 or 6 weeks after initiation of the hardening treatments.

Feed and water was offered ad libitum and growth rate and feed consumption was determined every two weeks. Carcass firmness was determined after a 20 hour chill by subjective source (1=very soft to 5=very hard).

The results of the experiment are found in the following table. In Table 1, results of the pigs fed the control diet are tabulated in column 1. Pigs fed the diet of soy oil for the entire treatment period are tabulated in column 2. Pigs receiving diets (c) and (d) are tabulated in columns 3 and 4, respectively. The table is divided into four time periods with period 1 being the initial 4 weeks, and periods 2-4 being successive 2 week periods.

The term "Daily gain" is intended to mean the average number of pounds gained by the pigs in each group per day. The term "Daily feed" is intended to mean the average amount of feed consumed by the average pig in each group per day. Differences in daily gain feed intake between soy oil and both feed supplements were statistically significant in all periods (P<0.05). The term "F:G" means the pounds of feed necessary for the average pig in each group to gain one pound.

TABLE 1

Effect of Changing Fat Source on Growth Performance of Finishing Swine

| Fat Source: | None | Soy Oil | Prilled Saturated Fats | |
|---|---|---|---|---|
| | | | IV = 15 | IV = 30 |
| Period 1 (0–28 d) | | | | |
| Daily gain, lb/d | 1.64 | 1.56 | — | — |
| Daily feed, lb/d | 4.84 | 4.26 | — | — |
| F:G | 2.95 | 2.73 | — | — |
| Period 2 (29–62 d) | | | | |
| Daily gain, lb/d | 1.66 | 1.62 | 2.50 | 2.27 |
| Daily feed, lb/d | 5.01 | 4.67 | 7.46 | 7.01 |
| F:G | 3.02 | 2.88 | 2.98 | 3.09 |
| Period 3 (43–56 d) | | | | |
| Daily gain, lb/d | 1.60 | 1.46 | 2.03 | 1.85 |
| Daily feed, lb/d | 5.47 | 5.12 | 6.54 | 6.03 |
| F:G | 3.42 | 3.51 | 3.22 | 3.26 |
| Period 4 (57–70 d) | | | | |
| Daily gain, lb/d | 1.62 | 1.66 | 1.91 | 2.10 |
| Daily feed, lb/d | 5.93 | 5.79 | 6.80 | 7.29 |
| F:G | 3.66 | 3.49 | 3.56 | 3.47 |

Table 2 is intended to show the effect on carcass firmness of changing the saturated fat source at intervals prior to slaughter. Since the pigs subjected to the ration in the first column of Table 1 were fed dry meal only, the carcass firmness score in the first line of Table 2, i.e., 2.95, is considered to be the norm. The first column of Table 2 indicates the number of weeks the pigs were fed soy oil; the second column is indicative of the number of weeks the pigs were fed either of the two highly saturated fat sources. The results are tabulated in the third column.

TABLE 2

Effect of Changing Fat Source on Carcass Firmness in Finishing Swine

| Weeks Fed | | Carcass Firmness Score | |
|---|---|---|---|
| Soy Oil | Saturated Fats | | |
| 0 | 0 | | 2.95 |
| 10 | 0 | | 2.12 |
| 8 | 2 | IV = 15 | 2.80 |
| | | IV = 30 | 2.67 |
| 6 | 4 | IV = 15 | 3.19 |
| | | IV = 30 | 3.06 |
| 4 | 6 | IV = 15 | 3.74 |
| | | IV = 30 | 3.61 |

Overall the tests show that the utilization of the highly saturated fat in the feed ration during approximately the last 3 weeks results in a return of the carcass firmness to an acceptable level even though the pigs had previously been fed a highly unsaturated fat source. While the use of highly saturated fats may have been expected to yield some improvements in carcass firmness, it is surprising and significant that acceptable levels of carcass firmness were achieved by adding the highly saturated fat to the diet for merely the last 2–3 weeks of the cycle.

What is significantly more surprising about the tests are the results tabulated in Table 1 concerning the effect of using the highly saturated fat diet supplement on growth performance. This is totally unexpected. It appears that there are two features of the feed ration which independently and in combination lead to this result. The first feature is the inclusion in the ration of the highly saturated fats having an iodine value in the range of 5–35 which apparently makes the fats more digestible than would have been expected. Secondly, it is believed that the prilling of the highly saturated fat granules also improves digestibility because of the significant increase in the surface area of the granules which are exposed to the digestive juices in the animal's stomach. In any event, the enhanced growth performance results are significantly out of line with what might have been expected. In view of these results, it would be recommended that the highly saturated fat be fed to the animal during the entire growing-finishing period. However, any portion may prove beneficial.

As far as the preferred embodiment is concerned, it is believed that a prilled animal fat which has been hydrogenated to an iodine value in the range of 16–20 added in an amount equaling approximately 5% of the animal's diet is ideal. It should be recognized that auxiliary substances can be added to the highly saturated fat to control solubility, density, melting point, color, or other physical or chemical characteristics. Some of these auxiliary substances can improve the utilization of the highly saturated fat product or change the color or appearance or melting point for ease in handling or other usage considerations. Examples of such substances include: emulsifiers and surfactants such as lecithin and guar gum; pH control or buffer agents such as calcium carbonate; and particle modifiers such as chitin, calcium alginate and the like.

While a preferred embodiment has been described and explained in detail hereinabove, it is obvious that various changes and modifications might be made in the type of fatty acids introduced (such as would be available from vegetable oils), the percentage thereof, the iodine value thereof, other procedures for forming small waxy granules, and the type of dry matter in the diet without departing from the scope of the invention which is set forth in the accompanying claims.

I claim:

1. A process for enhancing the growth performance of edible meat-producing animals selected from the group consisting of swine, poultry, and beef cattle, consisting essentially of feeding to said animals, along with conventional feed ingredients, no more than 10% by weight of waxy granules of a highly saturated fat having at least 10 carbon atoms selected from the group consisting of monoglycerides, diglycerides, triglycerides, free fatty acids, and esterified fatty acids, said highly saturated fat having an iodine value in the range of 5 to 35, a particle size diameter of approximately 1,000 microns and being fed to said animals during at least a portion of the growing-finishing cycle, said process eliminating pale, soft and exudative meat and improving carcass firmness and meat quality.

2. The process according to claim 1 wherein said highly saturated fats have an iodine value in the range of 16–20.

3. The process according to claim 1 wherein said highly saturated fat makes up 2–7% of the animal's diet.

4. The process according to claim 1 wherein said highly saturated fat is added in amounts of 5% of the animal's diet.

5. The process according to claim 1 wherein said highly saturated fat is prilled.

6. The process according to claim 1 wherein said fatty acids have an iodine value in the range of 16–20.

7. The process according to claim 1 wherein said highly saturated fat makes no more than 10% of the animal's diet.

8. The process according to claim 1 wherein said highly saturated fat is added in amounts of 5% of the animal's diet.

9. The process according to claim 1 wherein said highly saturated fat is fed to the animal the last 6 weeks of the growing-finishing cycle.

10. The process according to claim 1 wherein said highly saturated fat is fed to the animal the last 3 weeks of the growing-finishing cycle.

* * * * *